No. 708,804. Patented Sept. 9, 1902.
H. C. ERBE.
GRAIN OR HAY DELIVERER.
(Application filed May 15, 1901.)
(No Model.) 7 Sheets—Sheet 1.
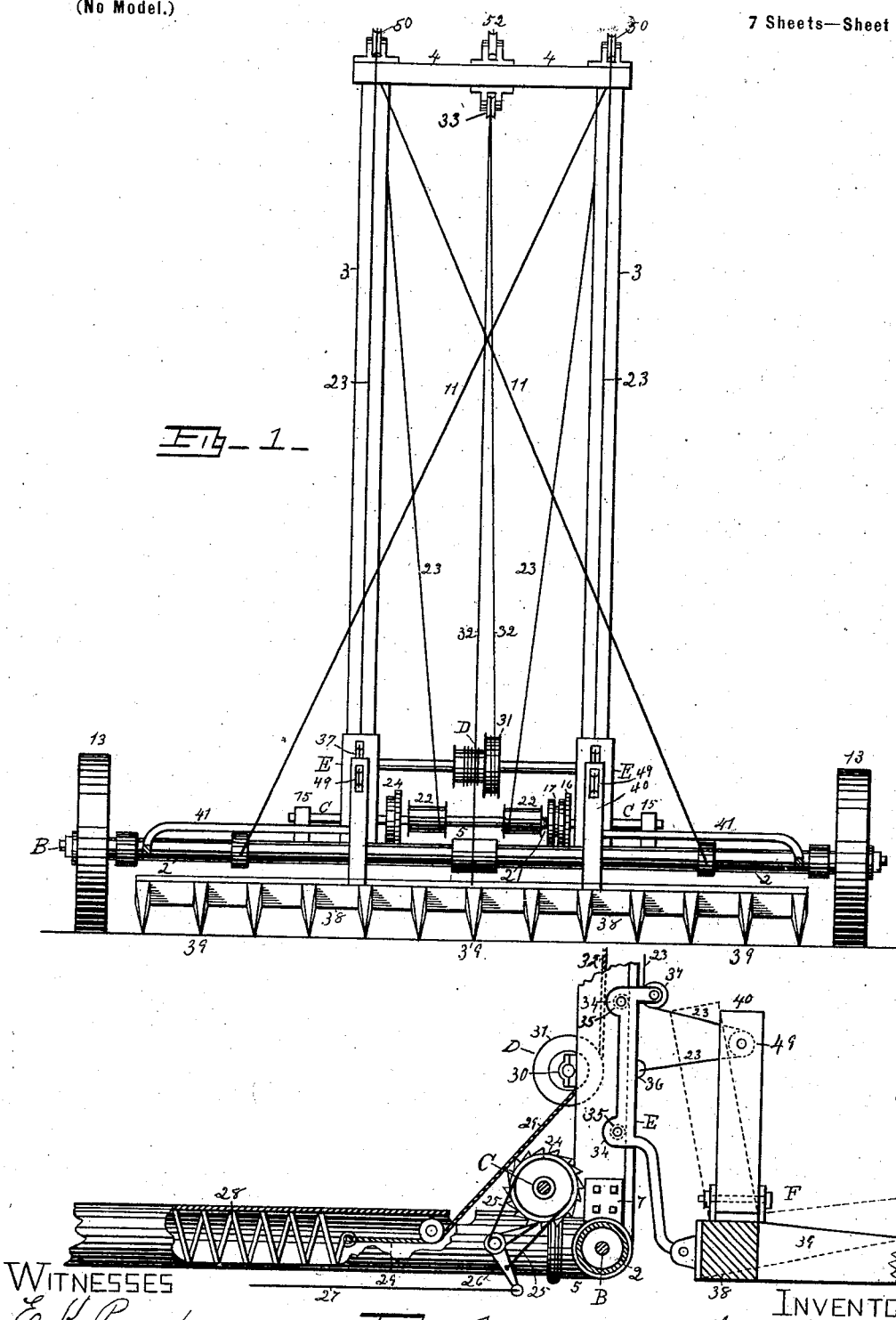
WITNESSES
E. K. Powers
L. F. McIntosh
INVENTOR
Henry C. Erbe
By J. W. Powers
atty

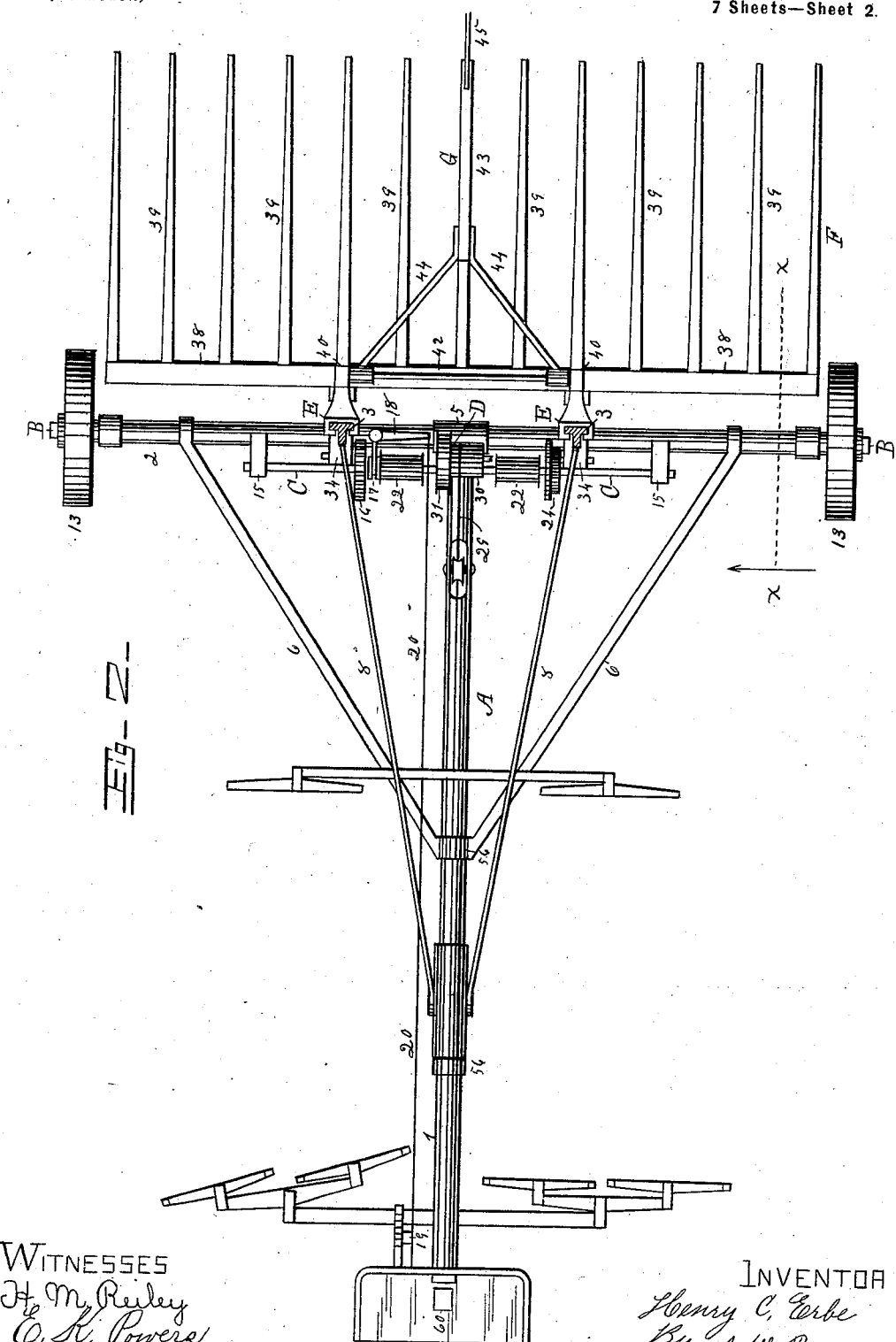

No. 708,804. Patented Sept. 9, 1902.
H. C. ERBE.
GRAIN OR HAY DELIVERER.
(Application filed May 15, 1901.)
(No Model.) 7 Sheets—Sheet 3.
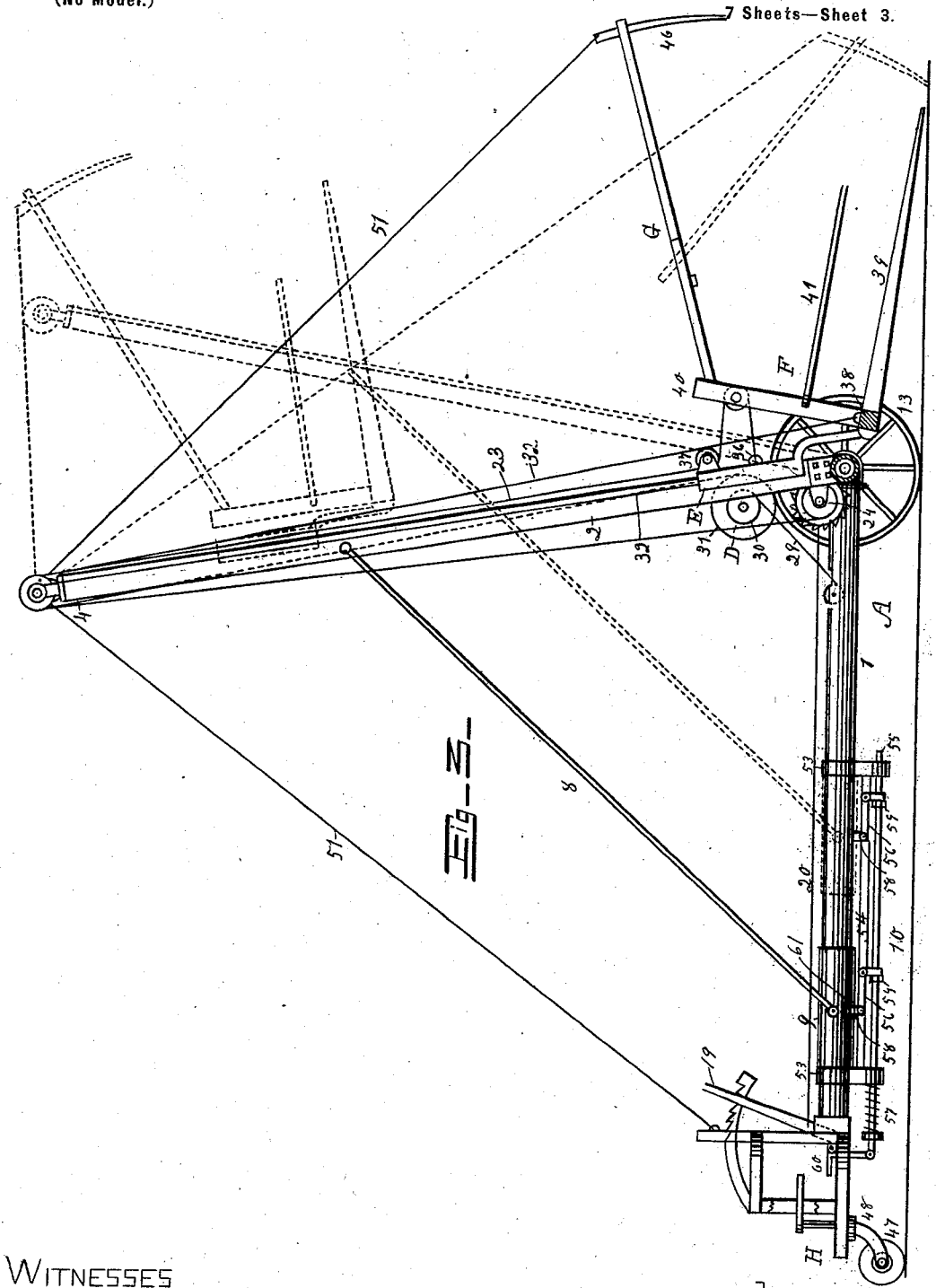
WITNESSES
H. M. Reiley
E. K. Powers
INVENTOR
Henry C. Erbe
By J. W. Powers
Atty No. 708,804. Patented Sept. 9, 1902.
H. C. ERBE.
GRAIN OR HAY DELIVERER.
(Application filed May 15, 1901.)
(No Model.) 7 Sheets—Sheet 4.
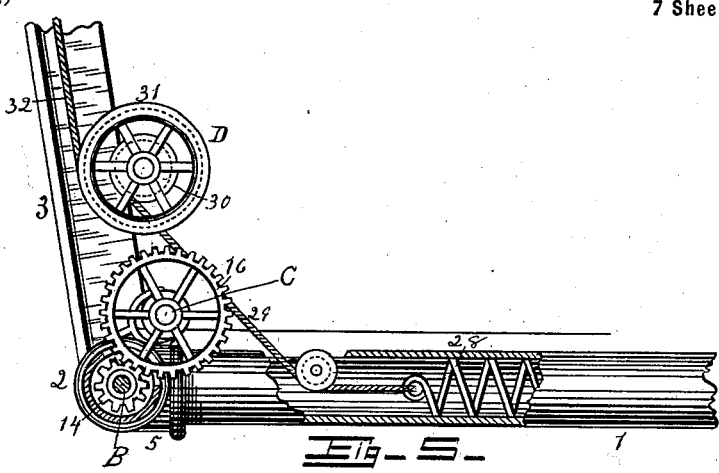
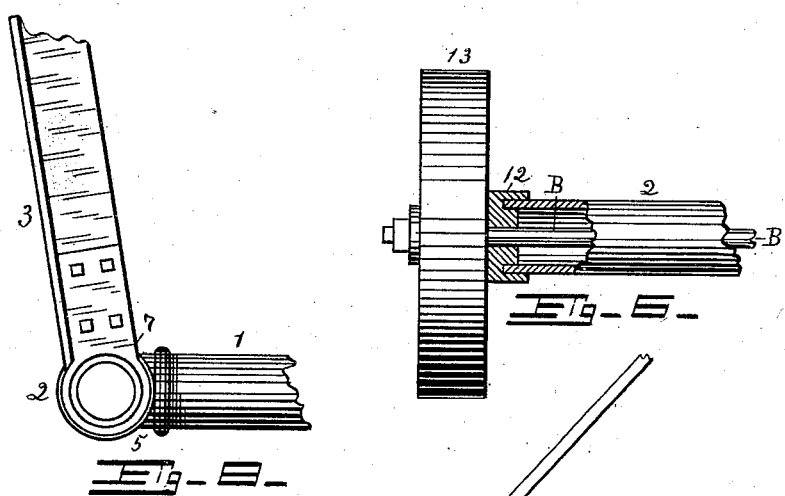
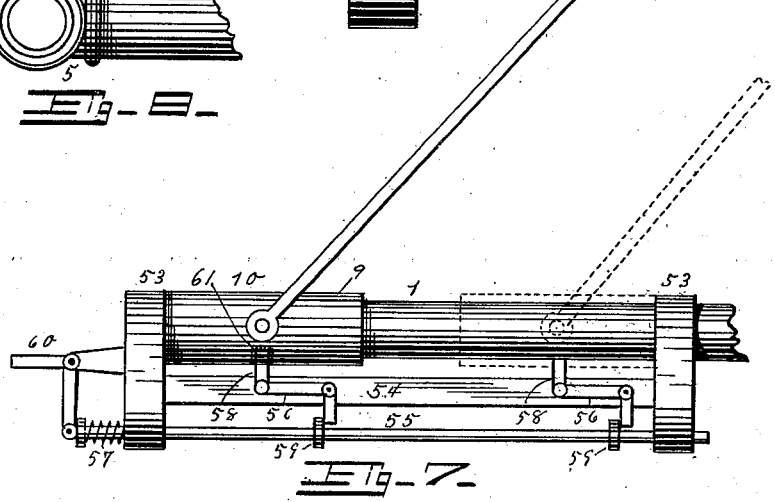
WITNESSES
H. M. Reiley
E. K. Powers
INVENTOR
Henry C. Erbe
By J. W. Powers
Atty No. 708,804. Patented Sept. 9, 1902.
H. C. ERBE.
GRAIN OR HAY DELIVERER.
(Application filed May 15, 1901.)
(No Model.) 7 Sheets—Sheet 5.
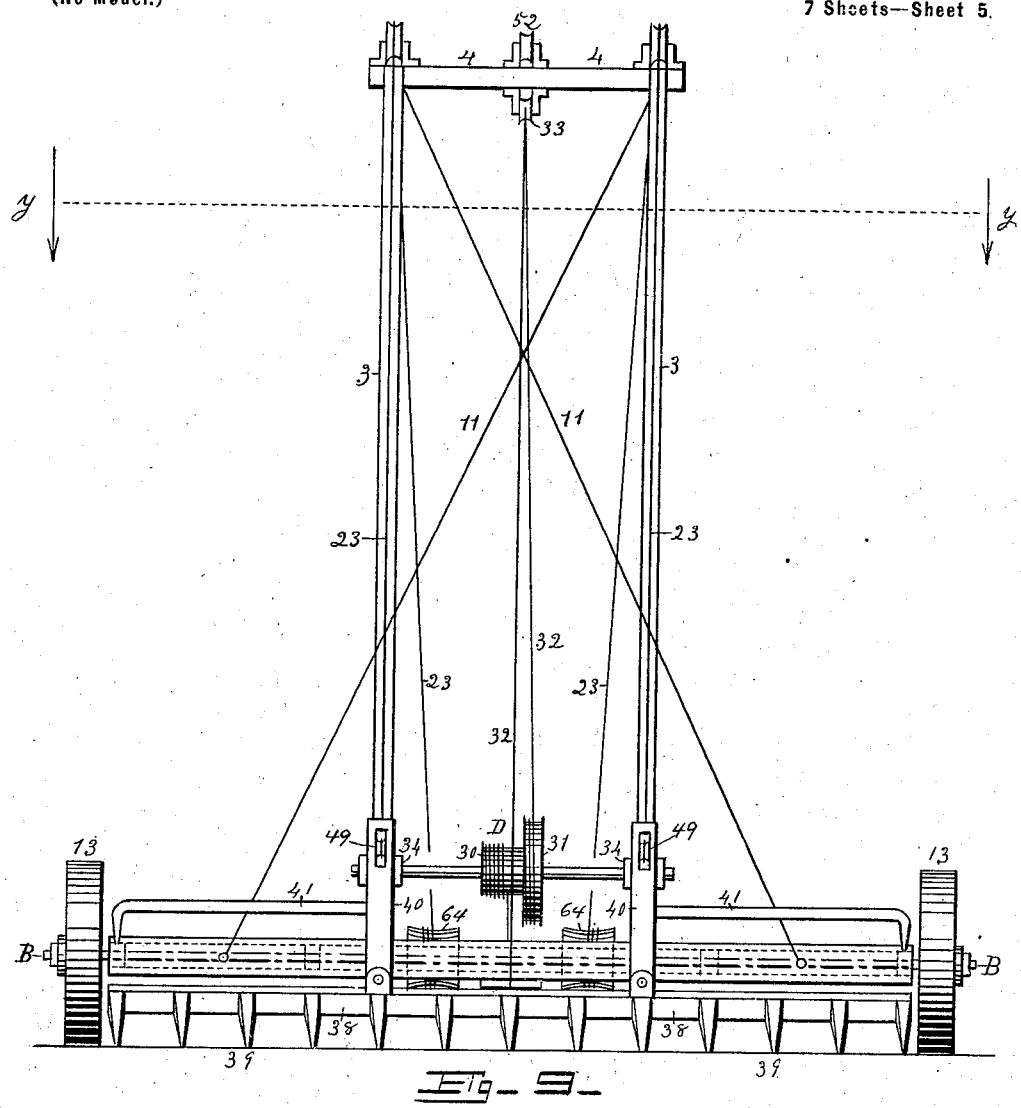
Witnesses
H. M. Reiley
E. K. Powers
Inventor
Henry C. Erbe
By J. W. Powers
Atty No. 708,804. Patented Sept. 9, 1902.
H. C. ERBE.
GRAIN OR HAY DELIVERER.
(Application filed May 15, 1901.)
(No Model.) 7 Sheets—Sheet 6.
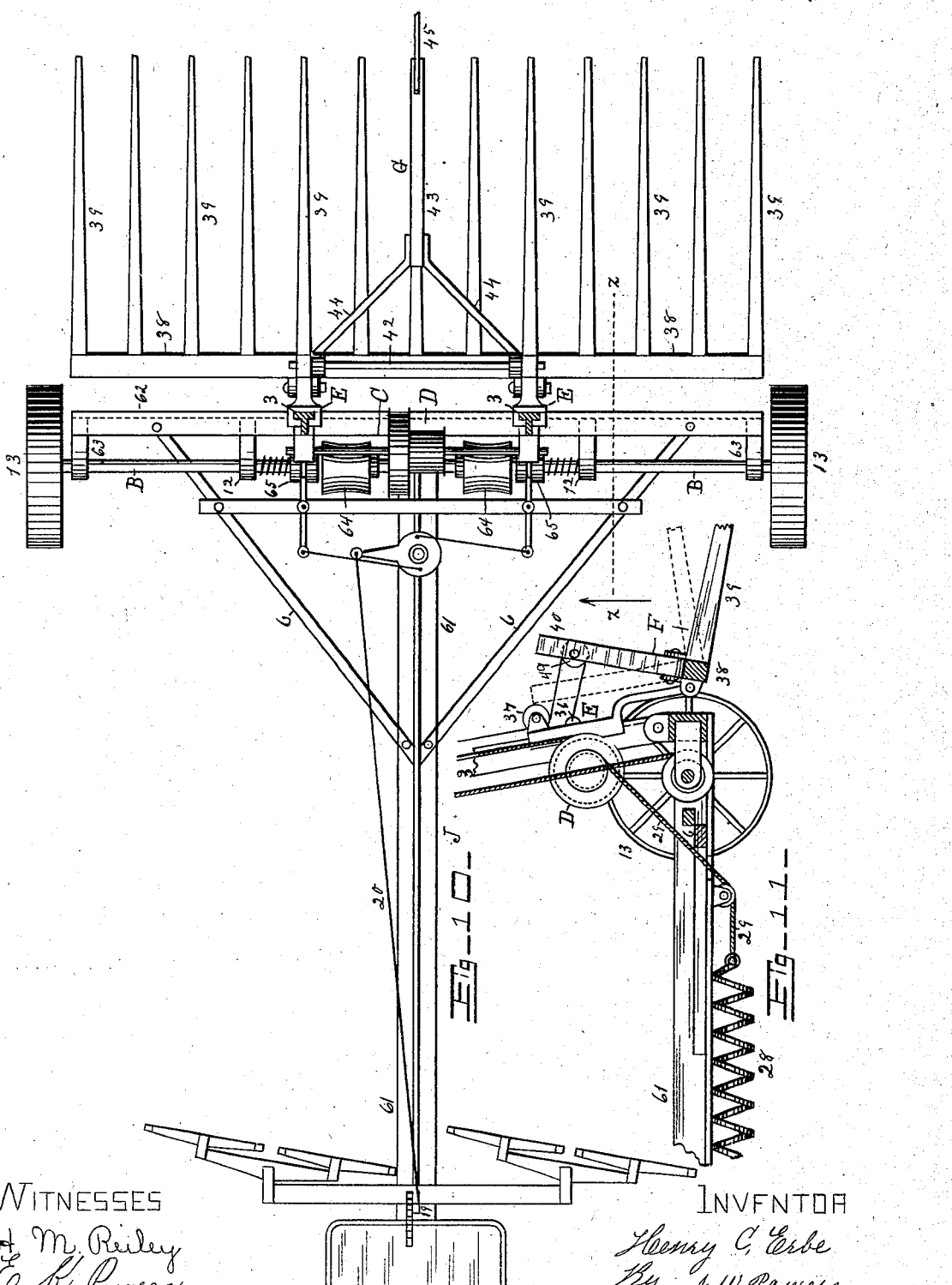
WITNESSES
H. M. Reiley
E. K. Powers
INVENTOR
Henry C. Erbe
By J. W. Powers
Atty

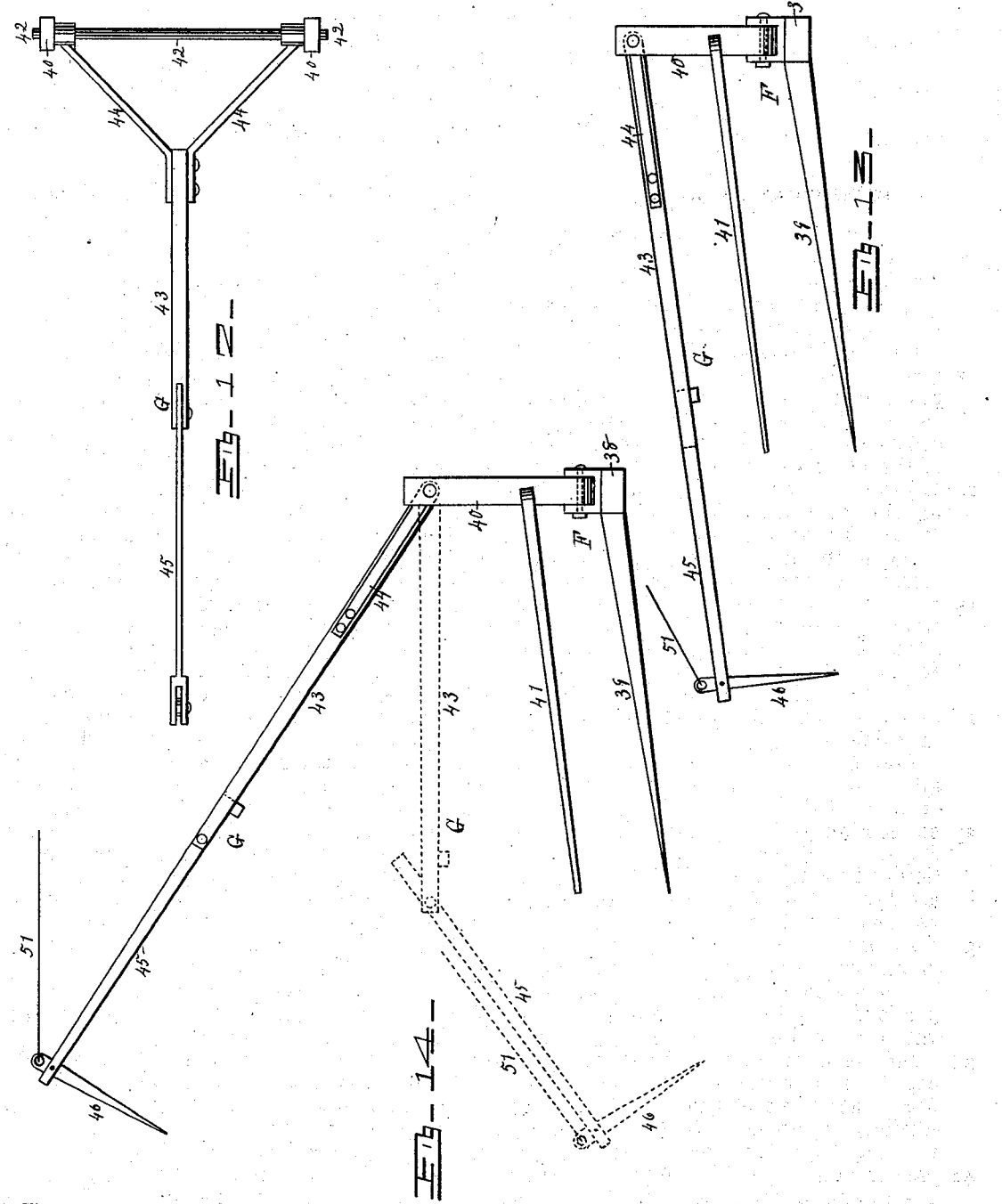

UNITED STATES PATENT OFFICE.

HENRY C. ERBE, OF BOWDLE, SOUTH DAKOTA.

GRAIN OR HAY DELIVERER.

SPECIFICATION forming part of Letters Patent No. 708,804, dated September 9, 1902.

Application filed May 15, 1901. Serial No. 60,412. (No model.)

*To all whom it may concern:*

Be it known that I, HENRY C. ERBE, a citizen of the United States, residing at Bowdle, county of Edmonds, and State of South Dakota, have invented a new and useful Improvement in Grain or Hay Deliverers, of which the following is a full, clear, and exact description, such as will enable others skilled in the art to which my invention appertains to properly construct the same, reference being had to the accompanying drawings, which form a part of this specification.

My invention relates to agricultural implements, and especially to that class of implements employed in gathering, conveying, and stacking loose grain or hay; and the purpose of my invention is the production of a device adapted to all of these purposes.

To this end my invention consists of the device shown in the accompanying drawings, in which—

Figure 1 is a front elevation; Fig. 2, a longitudinal horizontal section of Fig. 1, taken on the line w w; Fig. 3, a longitudinal vertical section of Fig. 2, taken on the line x x; Fig. 4, a detail showing, partly in vertical section and partly in side elevation, portions of my device; Fig. 5, a detail, also showing in vertical section and side elevation other portions of my device; Fig. 6, a detail showing in vertical section still other portions; Fig. 7, a detail, showing in side elevation yet other portions; Fig. 8, a detail showing in side elevation a coupling or hinge-joint; Fig. 9, a front elevation of a modified construction; Fig. 10, a longitudinal horizontal section of Fig. 9, taken on the line y y; Fig. 11, a vertical section of a portion of Fig. 10, taken on the line z z; Fig. 12, a top view of the grain or hay packer; Fig. 13, a side elevation of the fork, guard, and packer; and Fig. 14, the same, but showing the parts in different positions.

Similar letters and numerals refer to similar parts throughout the several views, A being the frame; B, the axle or driving-shaft; C, the counter-shaft; D, the wheel and axle; E, the carriers; F, the fork; G, the grain or hay packer, and H the steering mechanism.

The frame A consists of the longitudinal beam 1, the transverse beam 2, the uprights 3, and the tie-beam 4. The horizontal portion of the frame A (the longitudinal beam 1 and the transverse beam 2) I construct of iron tubing, while I prefer to use T-iron for the uprights 3 and bar-iron for the tie-beam 4. The longitudinal beam 1 consists of one piece of tubing, while the transverse beam 2 consists of two pieces of tubing, the three pieces being united by means of a T-joint 5 in the usual manner of connecting tubes, thus forming two hollow sections, one being at a right angle to the other, and to give the frame rigidity I further connect these parts by means of the diagonal braces 6. The uprights 3 are adjustably connected to the transverse beam 2 by means of the couplings 7 to the end that they may be rearwardly inclined, as shown by the solid lines, or forwardly inclined, as shown by the dotted lines. (See Fig. 3.) These uprights are held (either forwardly or rearwardly inclined) by means of the downwardly and rearwardly extending braces 8, which braces extend to and are connected with a coupling 9, which coupling is longitudinally movable upon the tubular beam 1. This coupling 9 is locked in the required position by means of the locking device 10, hereinafter described. Tie-rods 11 are secured to the uprights 3 near their upper ends and extend diagonally downward therefrom, crossing at a point intermediate their length, their lower ends being affixed to the tubular beam 2. These tie-rods 11 serve to give rigidity to the frame. The tie-beam 4 is bolted to and connects the upper ends of the uprights 3.

The driving shaft or axle B is journaled in and incased by the tubular transverse beam 2, as shown in Figs. 2 and 6, the boxes 12 serving to keep it in line therewith and to hold it central therein. To the outer ends of this axle B are affixed the wheels 13, which support and carry the frame A. These wheels 13 are provided with ratchet-hubs and revolve the axle B when the machine is moved forward, thereby imparting power to a toothed pinion 14, affixed thereon, but revolve upon the axle B when the machine is moved backward. Such ratchet-hubs, however, are common to agricultural machinery, form no part of my invention, and therefore I do not deem it necessary to describe them in detail.

The counter-shaft C rotates in boxes 15, affixed to the transverse beam 2. A toothed wheel 16 is loosely journaled on the counter-shaft C and may revolve thereon or may revolve therewith, as will hereinafter be set forth. Its periphery cuts through the wall of the tubular beam 2, and its teeth engage those of the before-mentioned toothed pinion 14, affixed to the incased axle B. A longitudinally-movable clutch 17 is affixed to the counter-shaft C by means of a "slot and key," which when thrown into engagement with the loosely-mounted toothed wheel 16 serves to lock the latter therewith, thereby tightening it upon the counter-shaft C, which it now rotates through the operation of the toothed pinion 14, affixed on the axle B. This clutch 17 is operated (thrown into and out of engagement with the toothed wheel 16) by means of a bell-crank lever and rod. The bell-crank 18 is pivotally affixed to the transverse beam 2, one arm thereof being in engagement with the clutch 17, while the other arm thereof is connected with the locking-lever 19 at the driver's stand by means of the connecting-rod 20. The locking-lever 19 operates to hold the clutch 17 out of engagement with the toothed wheel 16 while the machine is gathering its load, and a spring 21, lying between the said clutch 17 and the spool 22, operates to throw the same into engagement when the machine is elevating its load. Spools 22 are rigidly affixed to the counter-shaft C, which serve (when the shaft is rotated) to wind the ropes or cables 23 in elevating the loaded fork.

A brake-wheel 24, having ratchet-teeth thereon, is rigidly affixed and is revoluble with the counter-shaft C. To the transverse beam 2 is attached a brake-band 25, which partly encircles the said brake-wheel 24, the purpose of which is to produce friction to retard the revolutions of the shaft when lowering the loaded fork F. A pawl 26 engages the teeth of the brake-wheel 24, thereby locking the counter-shaft C and holding the loaded fork F when elevated. This pawl 26 is released from engagement with the ratchet-teeth by applying the brake-band 25, both being operated by the same lever and rod 27. To further retard the descent of the fork F and to lessen the shock when it reaches the ground, I affix a spring 28 within the tubular longitudinal beam 1, attach a cable 29 thereto, which cable I extend and affix to the axle 30 of the wheel and axle D. To the wheel 31 of the wheel and axle D, I affix a cable 32, which cable I carry upward to and pass over a sheave-wheel 33, mounted upon the tie-beam 4, thence downward to and affix to the fork F. This chambered spring 28 helps also to draw the uprights 3 to their rearwardly-inclined position, (shown by the solid lines, see Fig. 3,) in which position they are held by means of the locking device 10, while the loaded fork F helps to draw the said uprights 3 to their forwardly-inclined position, (shown by the dotted lines,) in which position they are also held by means of the before-mentioned locking device 10. The wheel and axle D rotate in suitable boxes affixed to the uprights 3.

The carriers E slide upward and downward upon the uprights 3. They are fashioned with clutches 34, adapted to overlap portions of the rear faces of the uprights 3, which clutches may be provided with friction-rollers 35, (shown by dotted lines in Fig. 4;) are further provided intermediate their length with staples 36, to which the elevating ropes or cables 23 are attached; are still further provided at their upper ends with the sheave-wheels 37, under and around which the said elevating ropes or cables 23 are passed.

The fork F is hinged to the lower ends of the carriers E. It consists of the horizontal beam 38, the gathering-tines 39, the posts 40, and the guards 41. The beam 38, which supports the other parts, is parallel with the transverse beam 2 of the frame A. The gathering-tines 39 are horizontally affixed to the beam 38 and project forwardly therefrom. The posts 40 are secured to the beam 38 by means of U-shaped couplings 35, the connected lower ends of which are rigidly secured to the said beam 38 and the divided upper ends of which are pivotally affixed to the lower ends of the said posts 40 by means of horizontal bolts which pass through their laterally-pierced walls and through the lower ends of the said posts 40 from front to rear, or vice versa. This construction permits the horizontal beam 38 to tilt somewhat longitudinally, but prevents its rocking laterally. In the opposite outside faces of these posts are affixed the guards 41, which extend horizontally therefrom and parallel with the beam 38 to the end thereof, thence are forwardly bent and extend parallel with and directly above the two outside tines 39.

The grain or hay packer G is affixed to a horizontal rod 42, extending through and revoluble in the posts 40 of the fork F. It consists of a forwardly-projecting beam 43, to which are affixed two diagonal braces 44, which braces also extend to and are affixed to the horizontal rod 42. To the forward end of the projecting beam 43 is pivotally affixed an extension-beam 45, the forward end of which is bifurcated or provided with a vertical slot in which is pivoted a fork or spear 46. The attachment of the extension-beam 45 with the projecting beam 43 is such that while the former, 45, may fall below it cannot be raised above a point in line with the projecting beam 43 (see Fig. 3)—that is to say, it may be bent downward, but cannot be bent upward. The fork or spear 46, while pivotally affixed in the outer (forward) end of the extension-beam 45, occupies a position approximating a vertical. Its purpose will hereinafter be set forth.

The steering mechanism H consists of a revoluble wheel 47, journaled in the bifurcated lower end of the vertical shaft 48, which in turn is journaled in the rear end of the longitudinal beam 1 of the frame A. It is not unlike steering mechanism in general, hence needs no elaborate description herein.

The elevating ropes or cables 23 I affix to the before-mentioned staples 36 of the carriers E, pass them forward, under, and around the sheave-wheels 49 in the posts 40 of the fork F, thence under and around the sheave-wheels 37 of the carriers E, thence upward and over similar sheave-wheels 50, mounted upon the upper ends of the uprights 3, thence downward and affix them to the spools 22 of the counter-shaft C.

The grain or hay packer G is operated by means of a rope 51, affixed to the upper end of the spear or fork 46, which rope extends diagonally upward therefrom, passes over a sheave-wheel 52, mounted upon the tie-beam 4, thence diagonally downward to the driver's stand.

The locking device 10 serves to lock the longitudinally-movable coupling 9, the position of which determines that of the uprights 3. It consists of the hangers 53, affixed to the longitudinal beam 1 of the frame A, the horizontal bars 54, affixed thereto, the shifting bar 55, journaled in the said hangers 53, and the bell-cranks 56, pivotally affixed to the bar 54, a spring 57, operating to throw the said shifting bar 55 rearward, vertical locking-bolts 58, pivotally affixed to the said bell-cranks 56, collars 59, rigidly affixed on the said shifting bar 55, and a foot-lever 60. Its operation is as follows: The spring 57 operates to throw the locking-bolts 58 into recesses 61 in the movable coupling 9, thereby locking the said coupling and holding the uprights 3 in their then present positions. Then when it becomes necessary to change the position of the said uprights 3—for instance, to throw them to their forwardly-inclined position, as when lowering the fork F—the driver depresses the foot-lever 60, thereby compressing the spring 57 and drawing the shifting rod 55 forward, the collars 59 of which contacting with and actuating the bell-cranks 56, which in turn withdraws the locking-bolts 58 from the recesses 61 of the coupling 9.

The operation of my machine is as follows: The horses being attached, the uprights 3 being rearwardly inclined, as shown in Fig. 3, and the driver at his post, the machine is drawn (or rather is pushed) into the field and to the end of the windrow of grain or hay, the forward ends of the gathering-tines 39 of the fork F resting upon or near the ground. The spear 46 of the packer G is now dropped by the driver, its point (lower end) piercing the windrow of grain or hay and entering the ground, when as the machine is moved forward the projecting beam 43 and the extension-beam 45, pivotally affixed thereto, fold, as shown by dotted lines, (see Fig. 3,) when as the machine moves still farther forward toward the affixed spear 46 the grain or hay is bunched upon the gathering-tines 39 of the fork F, the guards 41 serving to prevent its falling off the sides thereof. When the projecting beam 43 and the extension-beam 45 have folded to their limit and the spear 49 has been forced from the ground by the bunched grain or hay upon the fork F, the driver now pulls on the rope 51, thereby straightening the beams 43 and 45 of the packer G, thus bringing them into line, as shown by solid lines, then releases the said rope 51, when the said packer will fall by gravity, its spear portion 46 again piercing the windrow and entering the ground to again hold the grain or hay until the tines 39 of the fork F have gathered it thereon. This operation of holding and gathering the grain or hay by the packer and fork is repeated until the said fork F is loaded, when the driver throws the longitudinally-shifting clutch 17 of the counter-shaft C into engagement with the toothed wheel 16, thereby locking it on the said counter-shaft C, when the teeth of the pinion 14 of the axle B being in engagement with the teeth thereof will, as the machine is moved forward, rotate the said counter-shaft C, wind the elevating ropes or cables 23 upon the spools 22, and elevate the loaded fork F, as shown by the dotted lines, (see Fig. 3,) when the pawl 26, engaging the ratchet-teeth of the brake-wheel 24, will operate to lock the said counter-shaft C and will support the loaded fork in its then elevated position. To this extent my machine serves as a grain or hay gatherer. The machine is now pushed to the barn or stacking-ground, where the grain or hay is housed or stacked, and to this extent my machine serves as a conveyer of grain or hay. The driver now simultaneously releases the pawl 26 from engagement with the ratchet-teeth of the brake-wheel 24 and applies the brake-band 25 to the said brake-wheel 24, thereby producing friction to retard the descent of the fork F and its load, and at the same time depresses the foot-lever 60, thereby unlocking or releasing the locking mechanism from engagement with the longitudinally-movable coupling 9, when the weight of the fork F will throw the uprights 3 to their forwardly-inclined position, thus carrying the load forward from the machine and over the desired place of deposit, and as the loaded fork F descends the spring 28, chambered within the tubular beam 1 of the frame A, will operate to further retard the descent of the fork F and to ease the shock of its contact with the floor or ground. The horses are now backed, thereby withdrawing the gathering-tines 39 from underneath the deposited load of grain or hay. This operation of gathering, conveying, and depositing one load upon another may be repeated until the grain or hay is all housed or stacked, and to this extent my machine serves as a grain or hay stacker.

It is apparent that my machine may be employed to load grain or hay upon a wagon as well as to put it in the barn or stack.

The attachment of the elevating-ropes 23 in the manner above described is an important feature of my invention, and thereon depends the successful operation thereof, for when so arranged and when the fork F has gathered its load the said ropes in tightening to elevate the fork will first elevate the outer ends of the tines 39 by drawing the posts 40 of the fork F backward toward the carriers E, as shown by the dotted lines, thereby elevating the outer ends of the tines 39 and preventing the grain or hay from sliding forward thereon, while the guards 41 prevent its falling over the sides thereof.

In the modified construction shown in Figs. 9, 10, and 11 I construct my longitudinal beam 61 of T-iron and my transverse beam 62 of channel-iron in place of the iron tubing above described in connection with these parts. Otherwise the construction of the frame J is identical with the one hereinbefore described. In this modified construction I affix the boxes 63 to the rear face of the transverse beam 62 and journal the axle B therein. This permits of affixing the spools 64 and brake-wheel 65 upon the axle B, thereby dispensing with the counter-shaft C, thus simplifying the construction and reducing the cost of production. In all other respects the construction and operation of my machine are so nearly identical with the one above described that a description of its construction and operation would be but a useless repetition.

Having thus described my invention and its operation, what I claim as new, and desire to secure by Letters Patent, is—

1. In a grain or hay deliverer, the combination with a frame having a tubular longitudinal beam, a tubular transverse beam affixed thereto, uprights adjustably affixed to the said transverse beam, and a tie-beam connecting the said uprights; of an axle rotatable in boxes affixed in the said transverse beam; a toothed pinion rigidly affixed to the said axle; carriers affixed to, and longitudinally movable upon the said uprights; a fork hinged to, and movable with the said carriers; a grain or hay packer hinged to and movable with the said fork; a counter-shaft rotatable in boxes affixed to the said transverse beam; ropes or cables affixed to the said carriers, thence carried under and around sheave-wheels in the said fork, thence under and around other sheave-wheels affixed to the said carriers, thence over and around still other sheave-wheels supported by the said uprights, thence to and affixed in spools mounted upon the said counter-shaft; a toothed wheel loosely journaled upon the said counter-shaft, the teeth of which engage those of the toothed pinion affixed to the said axle; a clutch keyed upon, rotatable with and longitudinally movable upon the said counter-shaft; a spring operating to throw the said clutch into engagement with the said loosely-journaled toothed wheel, thereby locking it on the said counter-shaft; a lever operating to release, and to hold the said clutch out of engagement with the said loosely-journaled wheel; a ratchet-wheel and pawl, operating to lock the said counter-shaft to hold the said fork in its elevated position; a "wheel and axle" rotatable in boxes affixed to the said uprights; a spring affixed in and incased by the said longitudinal beam; a cable affixed in the periphery of the wheel of the said "wheel and axle" and extending to and over a sheave-wheel supported by the said tie-beam, thence to, and affixed in the said fork; and a similar cable affixed to the periphery of the axle of the said "wheel and axle" and connected with the said incased spring, all substantially as shown and for the purposes specified.

2. In a grain and hay deliverer, the combination with the frame, having a longitudinal beam and a transverse beam affixed thereto; of uprights pivotally affixed to the said transverse beam, a tie-beam connecting the said uprights; an axle rotatable in boxes affixed to the said transverse beam, carriers longitudinally movable upon the said uprights; a fork hinged to the said carriers; a packer affixed to the said fork; elevating-ropes affixed to the said carriers, connected with the said fork and wound upon spools rotated by the said axle; an operating-rope affixed to the said packer and extending to the driver's stand; a spring affixed to the said longitudinal beam; a "wheel and axle" mounted upon the said uprights; a cable extending from the said spring to the axle of the said "wheel and axle;" a similar cable extending from the wheel of the said "wheel and axle" to the said fork; and means for locking the said uprights in their forwardly-inclined position as when gathering, or in their rearwardly-inclined position as when conveying the grain or hay to the stacking-ground, substantially as shown and described.

3. In a grain and hay deliverer, the combination with the frame having a tubular longitudinal beam, a tubular transverse beam affixed thereto; an axle rotatable within the transverse beam; uprights adjustably affixed to the transverse beam; and a horizontal tie-beam affixed to said uprights; of carriers adjustably affixed to and longitudinally movable upon the said uprights; a fork having a horizontal beam to which are attached horizontal tines and guards, said fork being hinged to the said carriers and suspended in front of the said frame, said fork being carried by ropes or cables affixed to the said carriers, thence passing under and around sheave-wheels affixed in the said fork, thence extending under and around sheave-wheels affixed to the said carriers, thence over and around similar sheave-wheels supported by the said tie-beam or the said uprights, and thence to and around spools mounted upon a horizontal counter-shaft, said counter-shaft being revolved by the axle within the said tubular transverse beam, all substantially as shown and for the purposes specified.

4. In a grain and hay deliverer, the combination of the frame having a longitudinal beam, a transverse beam affixed thereto; inclinable uprights supported by the said transverse beam, a longitudinally-movable coupling mounted upon the said longitudinal beam; braces connecting the said uprights with the said coupling; a locking device for holding the said coupling, both in its forward and rearward positions; carriers mounted upon and longitudinally movable upon the said uprights; a fork hinged to the said carriers; an axle; carrying-wheels, both rotatable thereon and rotatable therewith; spools rotated by the said axle; and elevating-ropes affixed to the said carriers, connected with the said fork and wound upon the said spools, substantially as shown and for the purposes specified.

5. In a grain and hay deliverer, the combination with the frame having inclinable uprights, of an axle and carrying-wheels therefor; carriers mounted and longitudinally movable upon the said inclinable uprights; a spool rotated by the said axle; a fork hinged to the said carriers; ropes affixed to the said carriers, extending to and engaging with the said fork, thence to and wound upon the said spools, whereby when the said spools are rotated the fork will be elevated by the carriers, substantially as shown and for the purposes specified.

6. In a grain and hay deliverer, the combination with the frame mounted upon suitable wheels; of the adjustably-attached uprights, adapted to be inclined forward or rearward thereon; carriers sliding upward and downward upon the said uprights; a fork hinged to the lower end of the said carriers; a packer affixed to the said forks; cables for raising and lowering the said carriers and fork; a rope for operating the said packer, and means for winding the said cables to elevate the said fork, all substantially as shown and for the purposes specified.

7. In the frame of a grain and hay deliverer, the combination of the longitudinal beam to which the horses are attached; a transverse beam affixed thereto; inclinable uprights affixed to and supported by the said transverse beam; a tie-beam affixed to and connecting the said uprights; a longitudinally-movable coupling mounted upon the said longitudinal beam; braces connecting the said uprights and the said movable coupling, and means for locking the said coupling and for supporting the said uprights in their inclined positions, substantially as shown and for the purposes specified.

HENRY C. ERBE.

Witnesses:
    E. C. MORSE,
    W. H. SCOTT.